US010837537B2

(12) United States Patent
Yoshimura et al.

(10) Patent No.: US 10,837,537 B2
(45) Date of Patent: Nov. 17, 2020

(54) TRANSMISSION

(71) Applicant: HONDA MOTOR CO., LTD., Tokyo (JP)

(72) Inventors: Hajime Yoshimura, Wako (JP); Atsushi Yamada, Wako (JP); Takuya Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 16/345,021

(22) PCT Filed: Oct. 31, 2017

(86) PCT No.: PCT/JP2017/039326
§ 371 (c)(1),
(2) Date: Apr. 25, 2019

(87) PCT Pub. No.: WO2018/096880
PCT Pub. Date: May 31, 2018

(65) Prior Publication Data
US 2019/0277391 A1    Sep. 12, 2019

(30) Foreign Application Priority Data

Nov. 25, 2016 (JP) .................................. 2016-229331

(51) Int. Cl.
*F16H 57/021*    (2012.01)
*F16H 57/029*    (2012.01)
(Continued)

(52) U.S. Cl.
CPC ........... *F16H 57/021* (2013.01); *A01D 34/64* (2013.01); *F16H 57/029* (2013.01); *F16H 57/031* (2013.01); *F16H 57/032* (2013.01); *H02K 7/116* (2013.01); *A01D 34/69* (2013.01); *A01D 69/02* (2013.01); *A01D 2101/00* (2013.01);
(Continued)

(58) Field of Classification Search
CPC .... F16H 57/029; F16H 57/031; F16H 57/021; F16H 2057/02056; F16H 2057/02034
See application file for complete search history.

(56) References Cited

U.S. PATENT DOCUMENTS

2018/0363756 A1* 12/2018 Teillet .................. F16B 11/006
2019/0379254 A1* 12/2019 Denefleh ............... F16H 57/021
2020/0141493 A1*  5/2020 Akafuji ............... F16H 57/0446

FOREIGN PATENT DOCUMENTS

JP    2008-141825    6/2008
JP    2015-188340    11/2015
(Continued)

OTHER PUBLICATIONS

International Search Report, dated Dec. 12, 2017, 2 pages.
(Continued)

*Primary Examiner* — Patrick Cicchino
(74) *Attorney, Agent, or Firm* — Rankin, Hill & Clark LLP (57) ABSTRACT

In a transmission including: a transmission shaft driven by an electric motor; and a case that supports the electric motor and the transmission shaft, the transmission includes an adapter that is interposed between the case and the electric motor to which the electric motor is attached. The adapter is in contact with one end of the transmission shaft in an axial direction of the transmission shaft.

5 Claims, 8 Drawing Sheets

(51) Int. Cl.
*F16H 57/032* (2012.01)
*H02K 7/116* (2006.01)
*F16H 57/02* (2012.01)
*A01D 34/64* (2006.01)
*F16H 57/031* (2012.01)
*A01D 34/69* (2006.01)
*A01D 69/02* (2006.01)
*A01D 101/00* (2006.01)
*F16J 15/10* (2006.01)

(52) U.S. Cl.
CPC .............. *F16H 2057/02034* (2013.01); *F16H 2057/02056* (2013.01); *F16J 15/10* (2013.01)

(56) References Cited

FOREIGN PATENT DOCUMENTS

| WO | 2016/129511 | 8/2016 |
| WO | 2016/152454 | 9/2016 |
| WO | 2016/167321 | 10/2016 |

OTHER PUBLICATIONS

Japanese Office Action with English Translation dated Jul. 2, 2019, 7 pages.
European Search Report dated Oct. 9, 2019, 6 pages.
International Preliminary Report on Patentability dated May 31, 2019, 5 pages.

\* cited by examiner

TRANSMISSION

TECHNICAL FIELD

The present invention relates to a transmission.

BACKGROUND ART

There is hitherto known a self-propelled work machine using an electric motor as a power source that drives wheels (rear wheels) and a cutting blade (e.g., Patent Literature 1).

Figure 8:
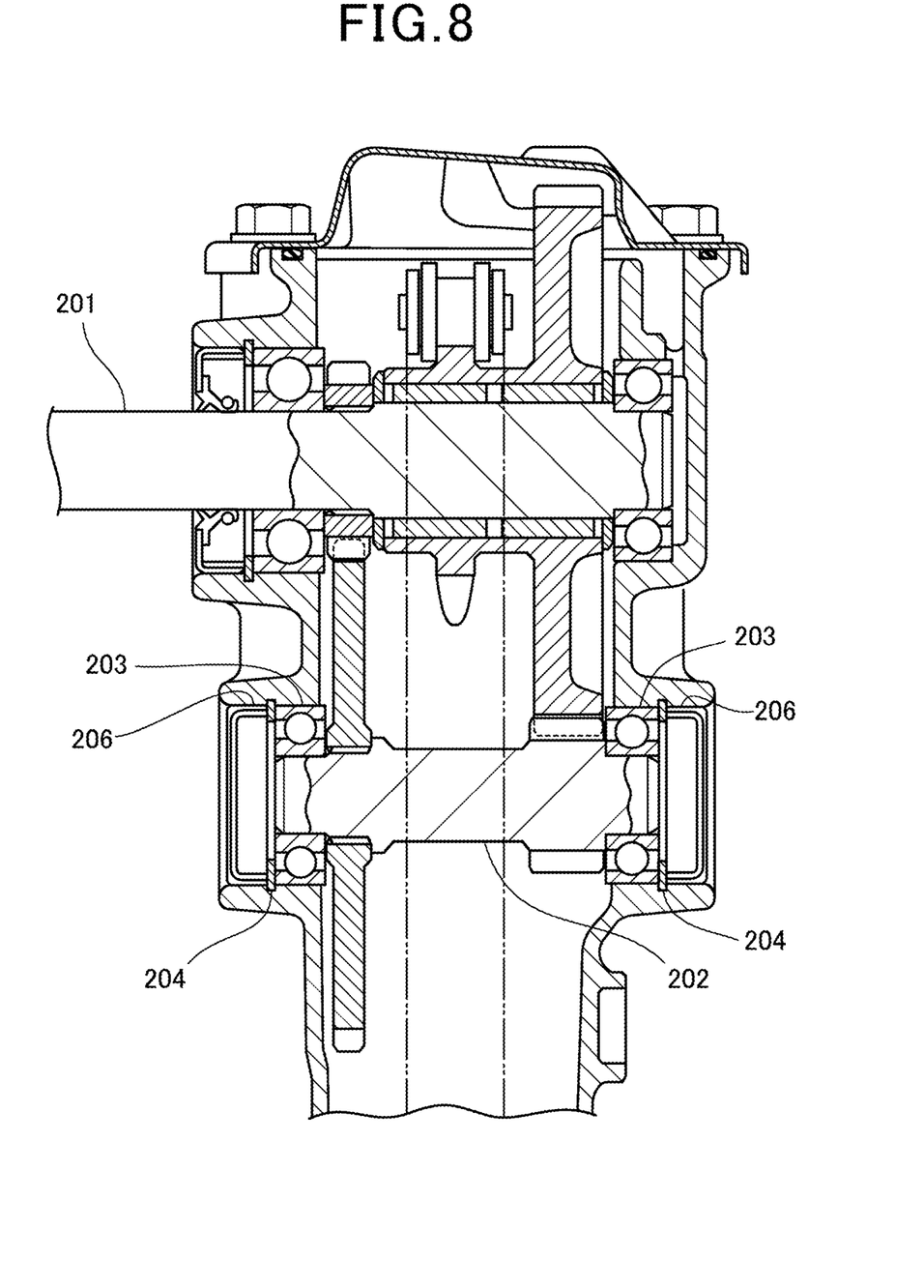
FIG. 8 is a sectional view of a conventional transmission.

In a transmission that transmits power from the electric motor to each of the wheels, a structure as in FIG. 8 is hitherto known. In the transmission of FIG. 8, a transmission shaft 202 meshing with an output shaft 201 of the electric motor is supported on opposite ends by a case 204 via bearings 203, 203, and retained by a retaining members 205, 205 engaged in the case 204 and in contact with the bearings 203, 203, and further, oil seals 206, 206 are provided on the outside of the transmission shaft 202 in the axial direction so as to seal lubricant.

CITATION LIST

Patent Literature

[Patent Literature 1]
Japanese Patent Laid-Open No. 2015-188340

SUMMARY OF INVENTION

Technical Problem

However, in such a transmission as the above conventional one, dedicated retaining members 205, 205 or the like have been needed for providing the transmission shaft 202 in the case 204, and the structure has become complicated.

The present invention was made in view of the circumstances described above, and an object of the present invention is to make it possible to simplify a structure in a transmission that transmits power of an electric motor.

Solution to Problem

This specification includes all contents of Japanese Patent Application No. 2016-229331 filed on Nov. 25, 2016.

For achieving the above object, in one aspect of the present invention, in a transmission including: a transmission shaft driven by an electric motor; and a case that supports the electric motor and the transmission shaft, the transmission including an adapter which is interposed between the case and the electric motor and to which the electric motor is attached, the adapter is in contact with one end of the transmission shaft in an axial direction of the transmission shaft.

With the configuration according to the one aspect of the present invention, the adapter to which the electric motor is attached is in contact with the end of the transmission shaft in the axial direction of the transmission shaft. Hence the transmission shaft can be retained using the adapter to which the electric motor is attached, so that it is possible to omit a dedicated retaining member and simplify the structure of the transmission.

Further, in one aspect of the present invention, the adapter is made of a material having electric insulation.

With the configuration according to the one aspect of the present invention, the adapter is made of a material having electric insulation, so that it is possible to attach the electric motor in an electrically insulating state to the transmission, and retain the transmission shaft by using the adapter.

Further, in one aspect of the present invention, the case includes an opening that exposes the one end of the transmission shaft to an outside of the case, and the one end of the transmission shaft and the adapter are in contact with each other in the axial direction of the transmission shaft through the opening.

With the configuration according to the one aspect of the present invention, the one end of the transmission shaft and the adapter are in contact with each other in the axial direction of the transmission shaft through the opening of the case. It is thus possible to bring the adapter into contact with the one end of the transmission shaft exposed from the opening and retain the transmission shaft with a simple structure.

Further, in one aspect of the present invention, the transmission shaft includes a shaft supported by the case, and a gear rotationally provided on the shaft to mesh with a motor output shaft of the electric motor, and the shaft is retained by the adapter.

With the configuration according to the one aspect of the present invention, the transmission shaft includes a shaft supported by the case, and a gear rotationally provided on the shaft to mesh with a motor output shaft of the electric motor, and the shaft is retained by the adapter. As a result, the shaft supporting the gear hardly rotates, and the shaft can thus be easily retained by the adapter.

Further, in one aspect of the present invention, the case includes a support hole portion that supports one end of the shaft and communicates with an inside and the outside of the case, the one end and the adapter are in contact with each other in the axial direction of the shaft through the support hole portion, and a seal member is provided between an outer periphery of the one end and the support hole portion.

With the configuration according to the one aspect of the present invention, the one end of the shaft and the adapter are in contact with each other in the axial direction of the shaft through the support hole portion of the case, and the seal member is provided between the outer periphery of the one end and the support hole portion. Hence the one end of the shaft and the adapter can be brought into contact with each other through the support hole portion of the case to retain the transmission shaft with a simple structure, and the case is favorably sealed by the seal member provided between the outer periphery of the one end and the support hole portion.

Further, in one aspect of the present invention, a cover member covering the electric motor is attached to the adapter.

With the configuration according to one aspect of the present invention, since the cover member covering the electric motor is attached to the adapter, the cover member can be attached with a simple structure.

Advantageous Effects of Invention

In the transmission according to one aspect of the present invention, a dedicated retaining member can be omitted to simplify the structure of the transmission.

The transmission shaft can be retained using the adapter that insulates the electric motor.

The adapter and the transmission shaft can be brought into contact with each other through the opening of the case, so that it is possible to retain the transmission shaft with a simple structure.

Further, with the adapter being in contact with the shaft that hardly rotates, the shaft can be retained easily.

The case can be preferably sealed by the seal member.

The cover case can be attached with a simple structure.

DESCRIPTION OF EMBODIMENT

Hereinafter, the embodiment of the present invention will be described with reference to the drawings. During the description, directions such as front-rear, right-left, and up-down will be described taking a forward direction of a lawn mower 1 (work machine) as the front of the machine body. Symbol FR indicated in each drawing denotes the front of the machine body, symbol UP denotes the upper part of the machine body, and symbol LH denotes the left of the machine body.

Figure 1:
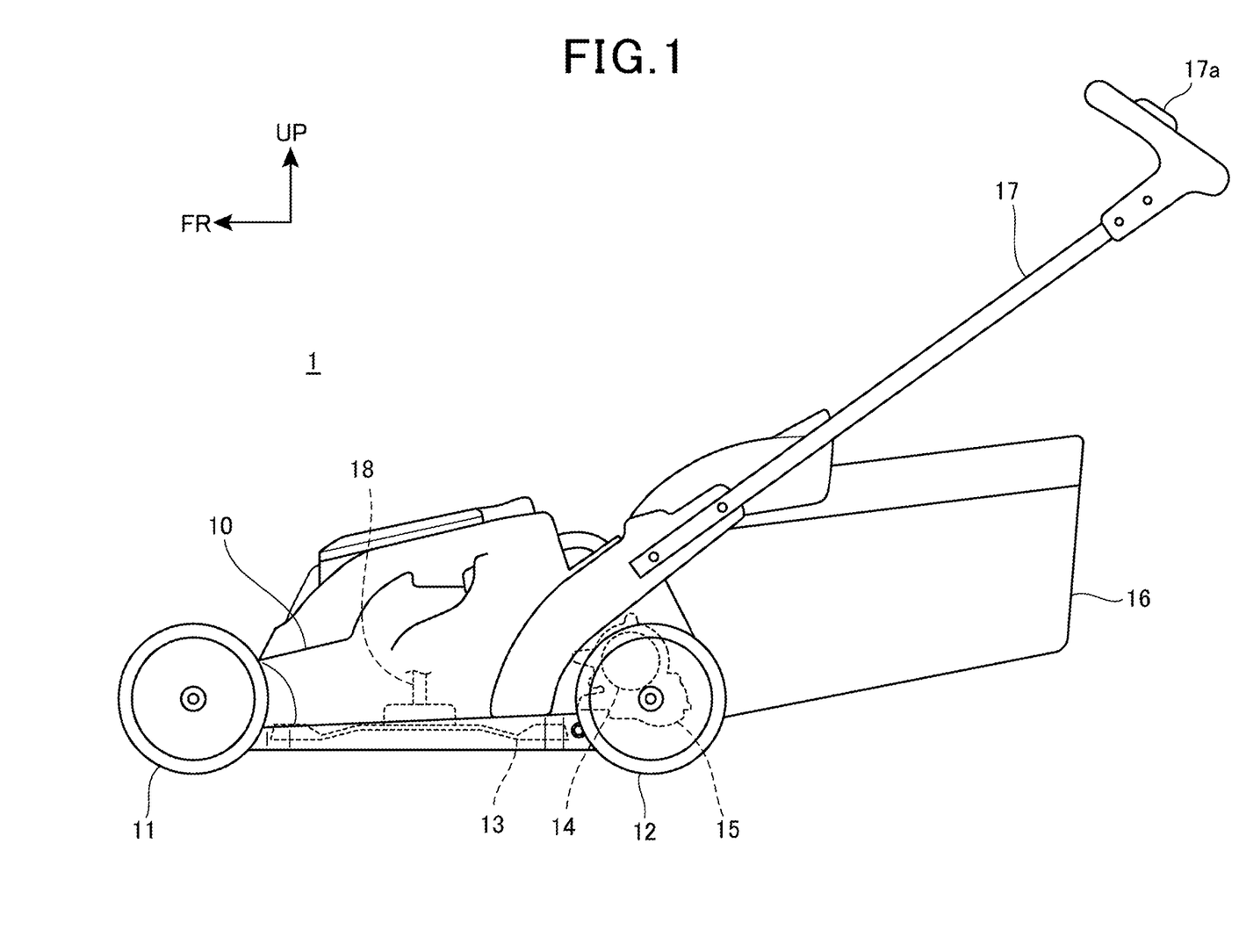
FIG. 1 is a left side view of a lawn mower according to an embodiment of the present invention.
Figure 2:
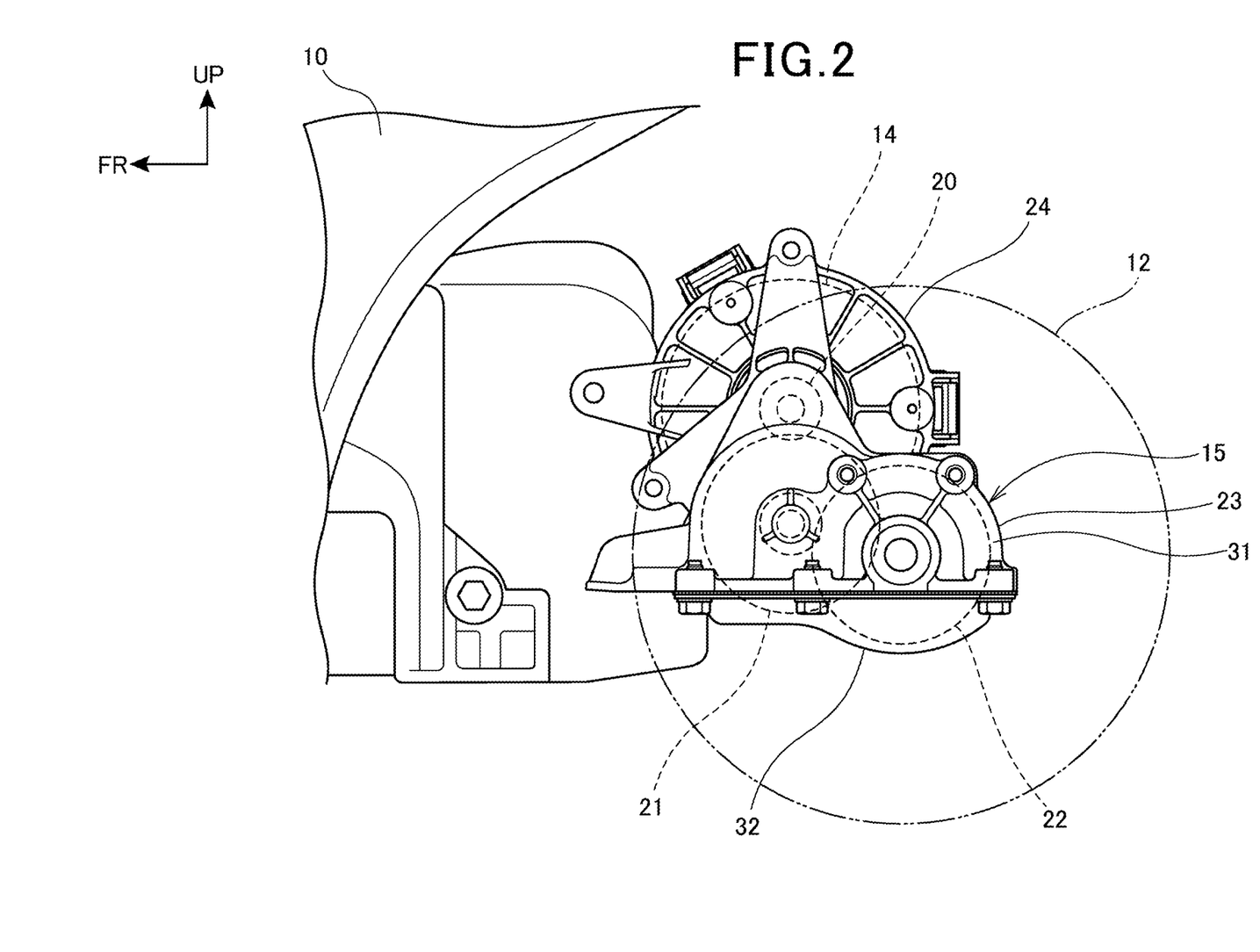
FIG. 2 is a left side view of the rear of the lawn mower.

FIG. 1 is a left side view of the lawn mower 1 according to the embodiment of the present invention. FIG. 2 is a left side view of the rear of the lawn mower 1. In FIGS. 1 and 2, as for ones provided as a lateral pair, only the left-side one is illustrated including its numeral. In addition, in FIG. 2, a part of the machine body is omitted for illustrating the internal configuration of the rear of the lawn mower 1.

The lawn mower 1 is a walking type self-propelled work machine with which an operator walks while operating the self-propelled lawn mower 1.

The lawn mower 1 includes: a housing 10; a lateral pair of front wheels 11, 11 provided on the right and left of the front of the housing 10; a lateral pair of rear wheels 12, 12 provided on the right and left of the rear of the housing 10; a lawn mowing cutter blade 13 housed inside the housing 10; and a driving motor (not illustrated) as a power source to drive the cutter blade 13. The driving motor is supported by the housing 10. Note that the power source of the cutter blade 13 may be an engine.

Further, the lawn mower 1 includes; an electric motor 14 (driving source) as a travelling power source to drive the rear wheels 12, 12; a transmission 15 that transmits the power of the electric motor 14 to each of the rear wheels 12, 12; a box-shaped mown grass container 16 attached to the rear of the housing 10; an operation handle 17 extending rearward and upward from the rear of the housing 10. The upper end of the operation handle 17 is provided with an operation unit 17a for the operator to control the number of revolutions of the driving motor, the number of revolutions of the electric motor 14, and the like. The transmission 15 is provided in the rear of the housing 10.

The electric motor 14 is driven by a battery mounted in the lawn mower 1. The lawn mower 1 moves forward by rotation of the rear wheels 12, 12 that are driven by the electric motor 14. As the driving source, an engine (internal combustion engine) may be used in place of the electric motor 14.

The housing 10 is formed in the shape of a case with its lower surface open, the lower surface facing a lawn, and the cutter blade 13 faces the lawn from the open portion on the lower surface of the housing 10. The cutter blade 13 is fixed to the lower end of a rotation shaft 18 extending in the up-down direction inside the housing 10, and mows glass by rotating around the rotation shaft 18 driven by the driving motor. The glass mown with the cutter blade 13 is called "mown glass." The mown glass is discharged rearward through a path in the housing 10 and housed into the mown grass container 16.

Figure 3:
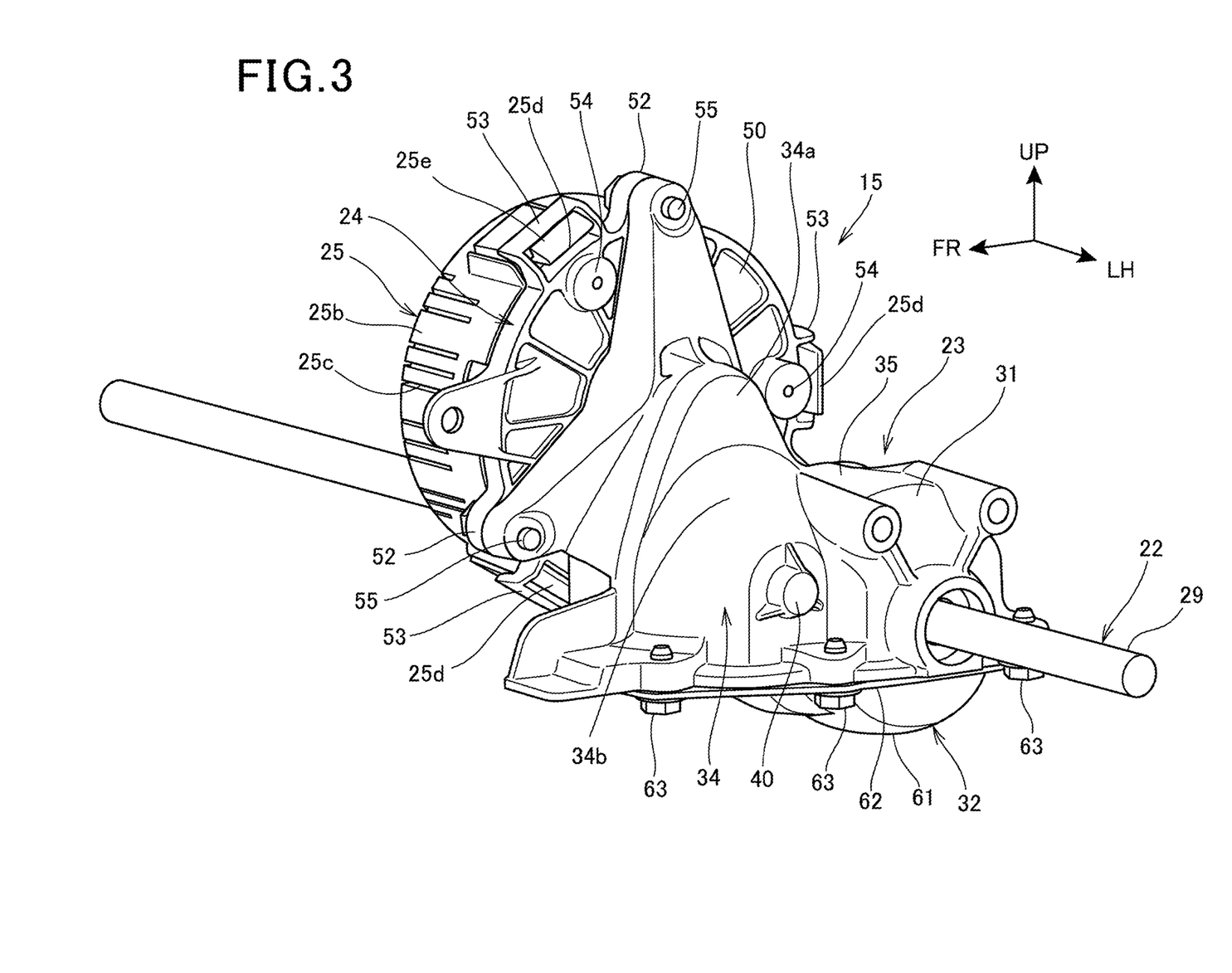
FIG. 3 is a perspective view of a transmission as viewed from the left front side.
Figure 4:
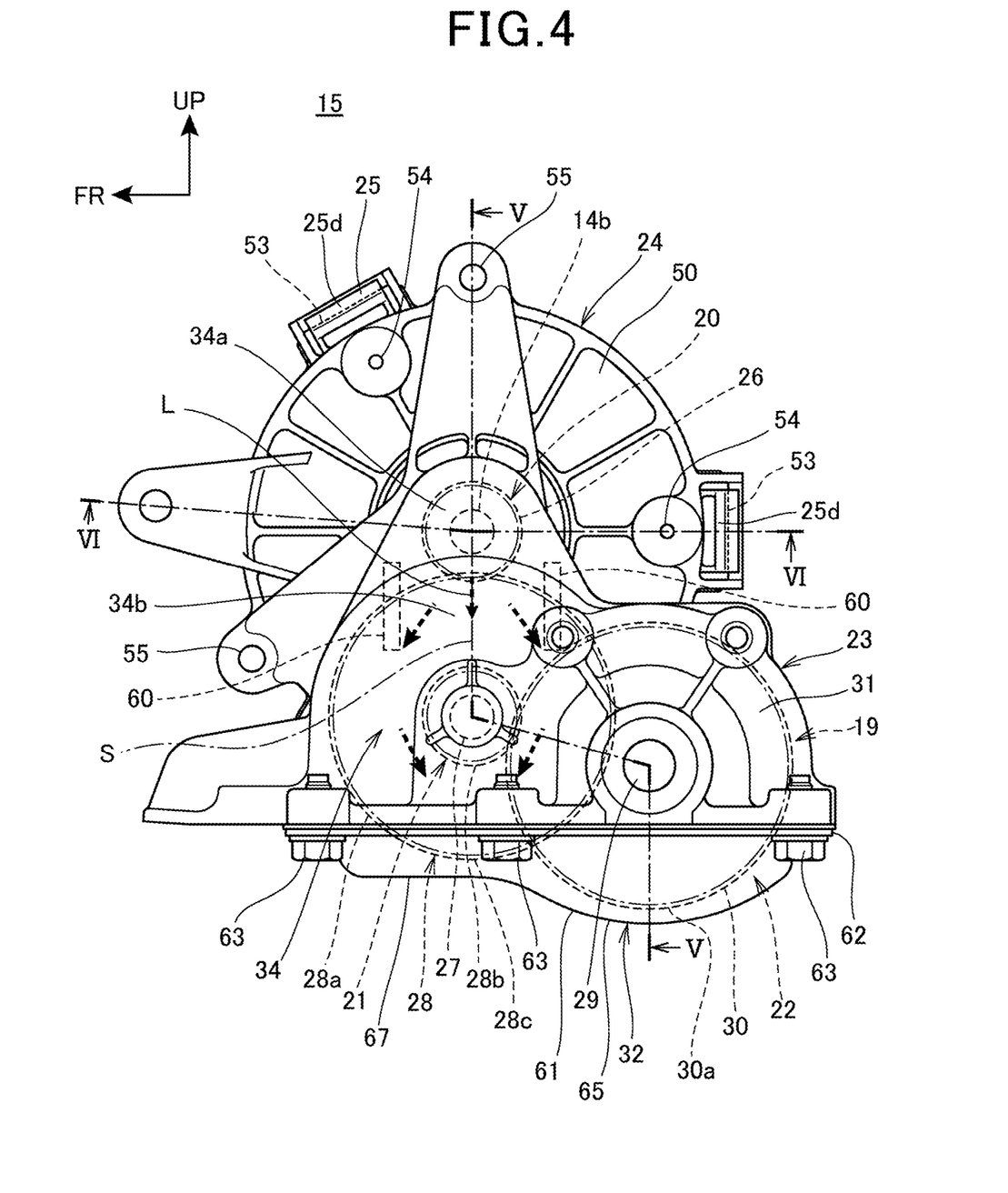
FIG. 4 is a left side view of the transmission.
Figure 5:
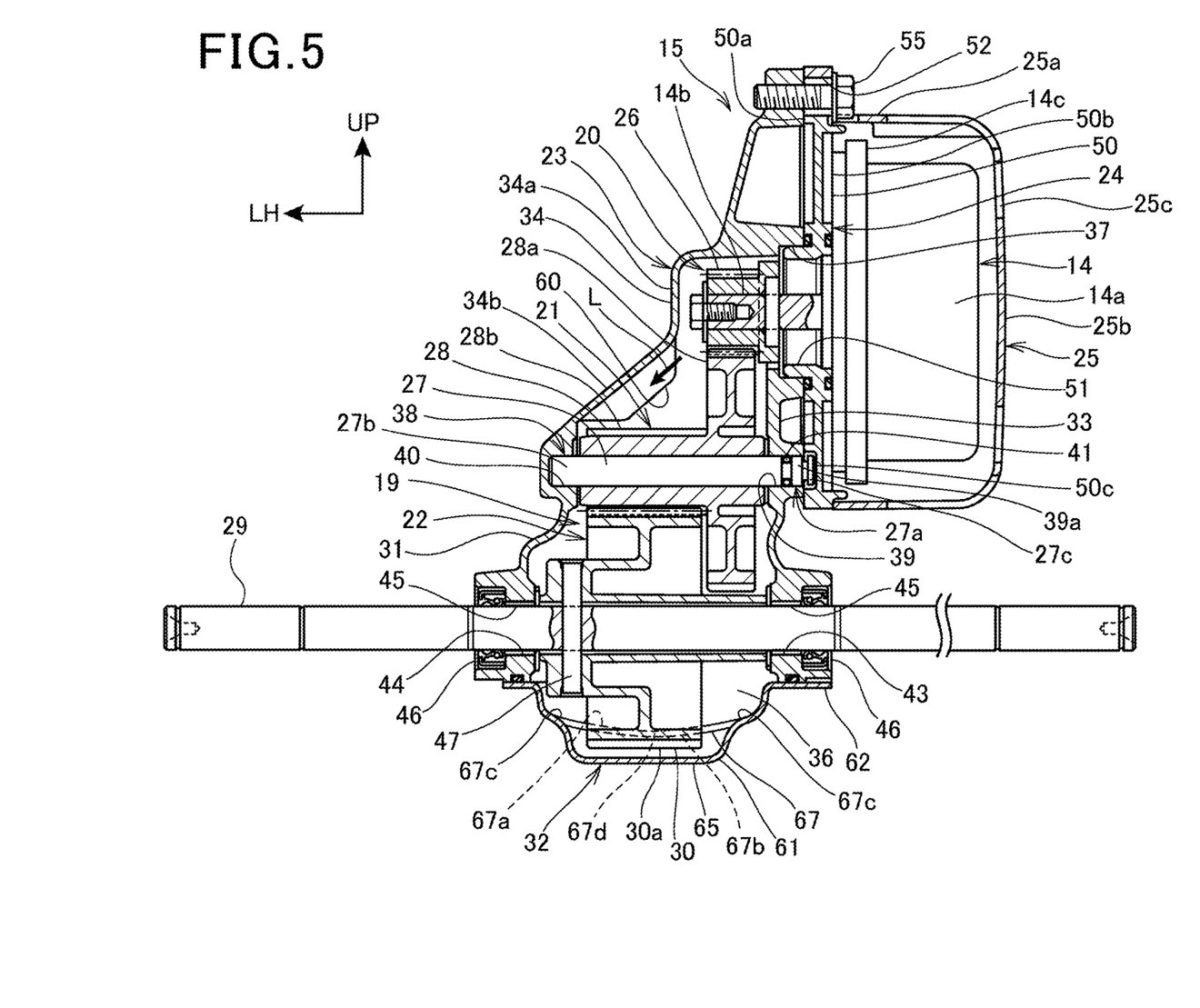
FIG. 5 is a sectional view taken along a line V-V of FIG. 4.

FIG. 3 is a perspective view of the transmission 15 as viewed from the left front side. FIG. 4 is a left side view of the transmission 15. FIG. 5 is a sectional view taken along a line V-V of FIG. 4.

With reference to FIGS. 3 to 5, the transmission 15 includes: an input shaft 20 into which the power from the electric motor 14 is input; a transmission shaft 21 that meshes with the input shaft 20; and an output shaft 22 that meshes with the transmission shaft 21. The input shaft 20, the transmission shaft 21, and the output shaft 22 extend parallel to one another in a machine-width direction of the lawn mower 1.

Further, the transmission 15 includes an input shaft 20, a case 23 that houses the transmission shaft 21 and the output shaft 22; an adapter 24 interposed between the case 23 and the electric motor 14, and a cover member 25 that covers the electric motor 14.

The transmission 15 is a speed reducer that reduces the speed of rotation, input from the electric motor 14, and outputs the rotation from the output shaft 22.

The electric motor 14 includes a cylindrical motor body portion 14a having a rotor and the like provided inside, and a motor output shaft 14b (driving source output shaft) extending from the central part of the motor body portion 14a.

The input shaft 20 includes a motor output shaft 14b, and an input gear 26 (a gear of the driving source output shaft) fixed to the motor output shaft 14b.

The transmission shaft 21 includes a shaft 27 supported by the case 23, and a counter gear 28 (gear) that meshes with the input gear 26 and is rotatable on the shaft 27.

The output shaft 22 includes an axle 29 supported by the case 23, and an output gear 30 (lowermost-level gear) that meshes with the counter gear 28 of the transmission shaft 21 and is integrally fixed with the axle 29.

The axle 29 is provided penetrating the case 23 of the lawn mower 1 in the machine-width direction. That is, the transmission 15 is mounted in the lawn mower 1 with the axle 29 extending in the machine-width direction. The right and left rear wheels 12, 12 (FIG. 1) are respectively provided at the right and left ends of the axle 29. Specifically, the transmission 15 is disposed to be offset on one side (left side) with respect to the center of the machine width of the lawn mower 1. Hence an amount of the axle 29 extended from the transmission 15 is smaller on the left side than on the right side.

The electric motor 14 is fixed to the right side surface of the case 23 via the adapter 24. In other words, the electric motor 14 is fixed to the inner side surface of the case 23 in the machine-width direction.

The case 23 includes, a case body 31 that houses a gear train 19 made up of the input gear 26, the counter gear 28, and the output gear 30, and an oil pan 32 provided at the bottom of the case body 31.

The case body 31 includes a one-side side wall 33 through which the motor output shaft 14b of the electric motor 14 is inserted from the outside, the other-side side wall 34 (side wall) facing the one-side side wall 33, a wall 35 constituting the front surface, the upper surface, and the rear surface of the case body 31, and the lower-surface opening 36 that opens downward the internal space of the case body 31. The lower-surface opening 36 is blocked by the oil pan 32.

As illustrated in FIG. 5, an insertion hole 37, through which the one-side side wall 33 penetrates, is formed in the one-side side wall 33 in the upper part of the case body 31, and the motor output shaft 14b constituting the input shaft 20 is inserted through the insertion hole 37 from the outside.

The transmission shaft 21 is supported by a shaft support portion 38 disposed immediately below the input shaft 20 and formed in the case body 31. The shaft support portion 38 includes a one-side support hole portion 39 (support hole portion) provided in the one-side side wall 33, and the other-side support hole portion 40 provided in the other-side side wall 34 in a concentric positional relation with the one-side support hole portion 39.

The one-side support hole portion 39 is a through hole penetrating the one-side side wall 33 in the machine-width direction, and is formed with an opening 39a that communicates the space in the case body 31 to the outside. The other-side support hole portion 40 is a blind hole formed in the inner surface of the other-side side wall 34, and does not penetrate the other-side side wall 34.

The shaft 27 of the transmission shaft 21 is fixed to the case body 31 by fitting of one end 27a (one end of the transmission shaft and one end of the shaft) into the one-side support hole portion 39 and by fitting of the other end 27b into the other-side support hole portion 40.

The one end 27a of the shaft 27 is formed with a protrusion 27c protruding from the opening 39a of the one-side support hole portion 39 to the outside of the one-side side wall 33.

Further, a seal member 41 is provided between the outer periphery of the one end 27a and the inner periphery of the one-side support hole portion 39. The seal member 41 is an O-ring made of rubber, for example, and fitted into an annular groove formed in the outer periphery of the one end 27a.

The counter gear 28 of the transmission shaft 21 is rotatably provided on the shaft 27 by engagement of a hole portion, provided at the center of the counter gear 28, with the outer periphery of the portion between the one end 27a and the other end 27b of the shaft 27.

The counter gear 28 has a driven gear portion 28a that meshes with the input gear 26, and a driving gear portion 28b that meshes with the output gear 30. The driven gear portion 28a and the driving gear portion 28b are integrally formed while arranged in the axial direction of the shaft 27, the driven gear portion 28a is positioned on the one-side side wall 33 side and the driving gear portion 28b is positioned on the other-side side wall 34 side. The driving gear portion 28b is a gear having a diameter smaller than that of the driven gear portion 28a.

The output shaft 22 is disposed below the transmission shaft 21 and in a position offset in the front-rear direction (rear) with respect to the transmission shaft 21.

The case body 31 includes an axle support hole portion 43 penetrating the one-side side wall 33, and an axle support hole portion 44 provided concentrically with the axle support hole portion 43 and penetrating the other-side side wall 34.

The axle 29 of the output shaft 22 is inserted into the axle support hole portions 43, 44 to be pivotally supported by the axle support hole portion 43 and the axle support hole portion 44. Specifically, the axle 29 is supported via cylindrical bushes 45, 45 fitted to the inner peripheries of the axle support hole portions 43, 44. In addition, annular oil seals 46, 46, which seal between the axle 29 and the axle support hole portions 43, 44, are provided outside the bushes 45, 45 in the axial direction in the axle support hole portions 43, 44.

The output gear 30 is fixed to the axle 29 with a pin 47 that is provided so as to penetrate the output gear 30 and the axle 29 in a radial direction. The output gear 30 is a gear having a diameter larger than that of the driving gear portion 28b of the counter gear 28.

Figure 6:
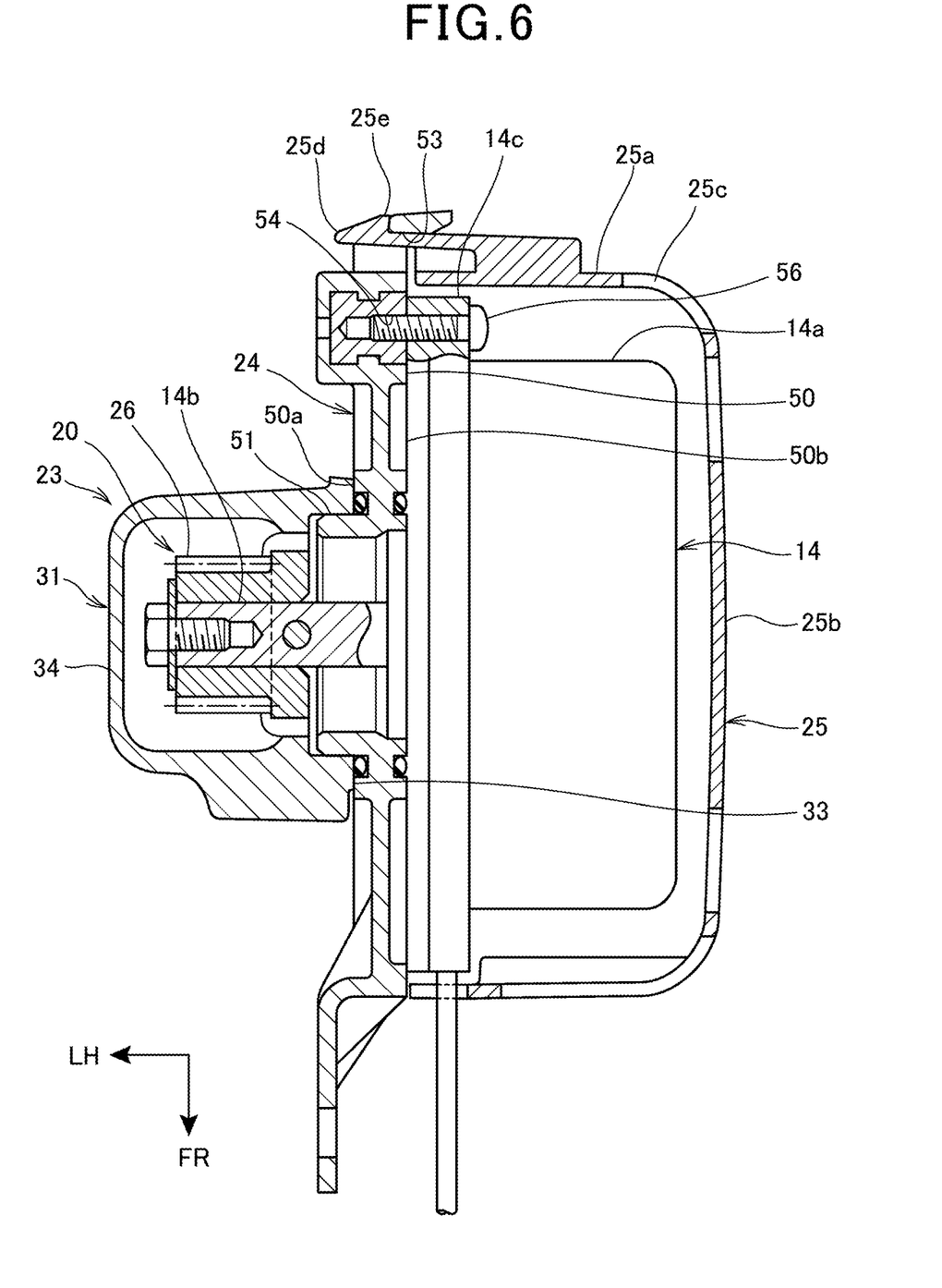
FIG. 6 is a sectional view taken along a line VI-VI of FIG. 4.

FIG. 6 is a sectional view taken along a line VI-VI of FIG. 4.

With reference to FIGS. 4 to 6, the adapter 24 includes the platy portion 50 formed in a circular plate shape, a tubular portion 51 protruding in a plate thickness direction from the central part of the platy portion 50, a fixing portion 52 provided on the outer periphery of the platy portion 50, a cover fixing portion 53 to which the cover member 25 is fixed, and a motor fixing portion 54.

The platy portion 50 includes a case contact surface 50a in contact with the outer surface of the one-side side wall 33 of the case body 31, and a motor attachment surface 50b to which the motor body portion 14a is attached on the rear surface side of the case contact surface 50a. The case contact surface 50a is formed with a contact portion 50c (FIG. 5) in contact with the one end 27a of the shaft 27.

The adapter 24 is made of a material having electric insulation and is made of resin, ceramics, or the like.

A fixing portion 52 is a hole for insertion of an adapter fixing bolt 55 that fixes the adapter 24 to the case body 31. A plurality of fixing portions 52 are provided at substantially equal intervals in a circumferential direction of the platy portion 50.

A plurality of cover fixing portions 53 are provided at substantially equal intervals in the circumferential direction of the platy portion 50.

The motor fixing portion 54 is a hole portion for fastening of a motor fixing bolt 56 (FIG. 6) that fastens the motor body portion 14a to the adapter 24. A plurality of motor fixing portions 54 are provided at substantially equal intervals in the circumferential direction of the platy portion 50. Each of the motor fixing portions 54 is provided at a position more inside than the fixing portion 52 and the cover fixing portion 53 in the radial direction of the platy portion 50.

The adapter 24 is disposed such that the case contact surface 50a comes into contact with the one-side side wall 33 while a tubular portion 51 is fitted into the insertion hole 37 of the one-side side wall 33, and the adapter 24 is fastened to one-side side wall 33 with the adapter fixing bolt 55 that is inserted into each fixing portion 52 from the motor attachment surface 50b side.

The electric motor 14 is disposed such that the motor output shaft 14b is inserted into the tubular portion 51 of the adapter 24 and the end surface of the motor body portion 14a comes into contact with the motor attachment surface 50b of the adapter 24. The electric motor 14 is fastened to the motor fixing portion 54 with a motor fixing bolt 56 that is inserted through a flange portion 14c on the outer periphery of the motor body portion 14a.

As thus described, by attaching the electric motor 14 to the insulating adapter 24, the electric motor 14 can be fixed to the transmission 15 while being electrically insulated from the case 23.

As illustrated in FIG. 5, in the state where the adapter 24 has been attached to the case body 31, the contact portion 50c of the adapter 24 comes into contact with the protrusion 27c of the one end 27a of the shaft 27 protruding to the outside through the opening 39a, and presses the shaft 27 to the other-side support hole portion 40 side in the axial direction. That is, the shaft 27 of the transmission shaft 21 is retained with respect to the shaft support portion 38 by the contact portion 50c of the adapter 24.

Specifically, the contact portion 50c is a recess formed by recessing of the case contact surface 50a in the protruding direction of the protrusion 27c, and the protrusion 27c comes into contact with the bottom of the recess.

As thus described, the shaft 27 can be retained by the adapter 24 configured to fix the electric motor 14 in the insulated state to the transmission 15, so that it is possible to omit a dedicated retaining member and simplify the structure of the transmission 15.

With the one-side support hole portion 39 including the opening 39a, one end 27a of the shaft 27 and the contact portion 50c can be easily brought into contact with each other through the opening 39a.

Further, in the transmission shaft 21, the counter gear 28 rotates on the shaft 27 and the shaft 27 hardly rotates, so that the shaft 27 can be retained even in the configuration where the adapter 24 is brought into contact with the one end 27a of the shaft 27.

Moreover, with the seal member 41 provided between the one end 27a of the shaft 27 and the one-side support hole portion 39, the sealability of the case body 31 can be ensured even in the configuration where the one-side support hole portion 39 includes the opening 39a.

The cover member 25 integrally includes a tubular peripheral wall 25a that covers the outer periphery of the motor body portion 14a, and a side wall 25b that closes one end of the peripheral wall 25a to cover the end surface of the motor body portion 14a in the axial direction. In the peripheral wall 25a and the side wall 25b, a plurality of air vents 25c are formed.

The peripheral wall 25a includes an engagement piece 25d protruding to the adapter 24 side from the end opposite from the side wall 25b. The engagement piece 25d includes a protrusion 25e protruding from the outer periphery of the tip to the outside of the peripheral wall 25a in the radial direction in a fingernail shape. A plurality of engagement pieces 25d are formed at substantially equal intervals in the circumferential direction of the peripheral wall 25a.

The cover fixing portion 53 of the adapter 24 is a hole portion into which the engagement piece 25d of the cover member 25 is inserted. The cover member 25 is fixed to the adapter 24 by insertion and engagement of each engagement piece 25d into each cover fixing portion 53.

The case 23 is filled with lubricant (not illustrated) that makes the input shaft 20, the transmission shaft 21, and the output shaft 22 lubricant. The lubricant is grease in the present embodiment, but the lubricant may be oil. The lubricant is stored in the lower part of the case 23 including the oil pan 32.

In the case 23, the input gear 26, the counter gear 28, and the output gear 30 are arranged sequentially from above in the up-down direction.

As illustrated in FIG. 4, the lower parts of the counter gear 28 and the output gear 30 are positioned inside the oil pan 32.

In the counter gear 28 and the output gear 30, at least the lower ends 28c, 30a are positioned inside the oil pan 32 and in contact with the lubricant stored in the oil pan 32. For this reason, in a state where the transmission 15 is driven by the electric motor 14, the lubricant of the oil pan 32, which adheres to each of the counter gear 28 and the output gear 30, is supplied upward by centrifugal force of the rotation of each of the counter gear 28 and the output gear 30, and is also supplied to a gear that directly meshes with the counter gear 28 and the output gear 30.

Specifically, as illustrated in FIG. 4, the output gear 30 meshes with the gear portion 28b of the counter gear 28, thereby enabling adhesion of the lubricant of the oil pan 32 to the driving gear portion 28b via the output gear 30. It is thus possible to appropriately supply the lubricant to the driving gear portion 28b positioned above the oil pan 32.

Further, as illustrated in FIG. 4, the driven gear portion 28a of the counter gear 28 has its lower end 28c positioned inside the oil pan 32 and meshes with the input gear 26 of the electric motor 14. This enables adhesion of the lubricant of the oil pan 32 to the input gear 26 via the driven gear portion 28a. It is thus possible to appropriately supply the lubricant to the input gear 26 positioned above the oil pan 32.

A part of the lubricant, supplied from the oil pan 32 to the input gear 26, the counter gear 28, and the output gear 30, drops by gravity to return to the oil pan 32 and is supplied again from the oil pan 32 to each of the input gear 26, the counter gear 28, and the output gear 30.

With reference to FIGS. 3 to 5, the other-side side wall 34 facing the tip of the motor output shaft 14b includes in its upper part a perpendicular portion 34a facing the tip of the motor output shaft 14b, and an inclined portion 34b inclined from the lower end of the perpendicular portion 34a and extending downward.

The inclined portion 34b is inclined so as to be more separated in the axial direction from the motor output shaft 14b toward the lower oil pan 32 side. The inclined portion 34b is provided immediately above the gear portion 28b of the counter gear 28, and formed in a position overlapping with the side surface of the upper part of the driven gear portion 28a in the axial view of the driven gear portion 28a as illustrated in FIG. 4. The interval between the inclined portion 34b and the side surface of the driven gear portion 28a increases in the downward direction.

The inclined portion 34b includes, on its inner surface, guide ribs 60, 60 protruding to the inside of the case 23. A pair of guide ribs 60, 60 are provided substantially parallel to an imaginary line S connecting the center of the input gear 26 and the center of the counter gear 28, and extend in the up-down direction. As illustrated in FIG. 4, the pair of guide ribs 60, 60 are provided so as sandwich the line S from opposite sides in the axial view of the counter gear 28, and are arranged in the front and rear of the counter gear 28.

The guide ribs 60, 60 are provided below the input gear 26 and above the driving gear portion 28b, and are formed in positions overlapping with the side surface of the upper part of the driven gear portion 28a in the axial view of the counter gear 28 (FIG. 4).

Figure 7:
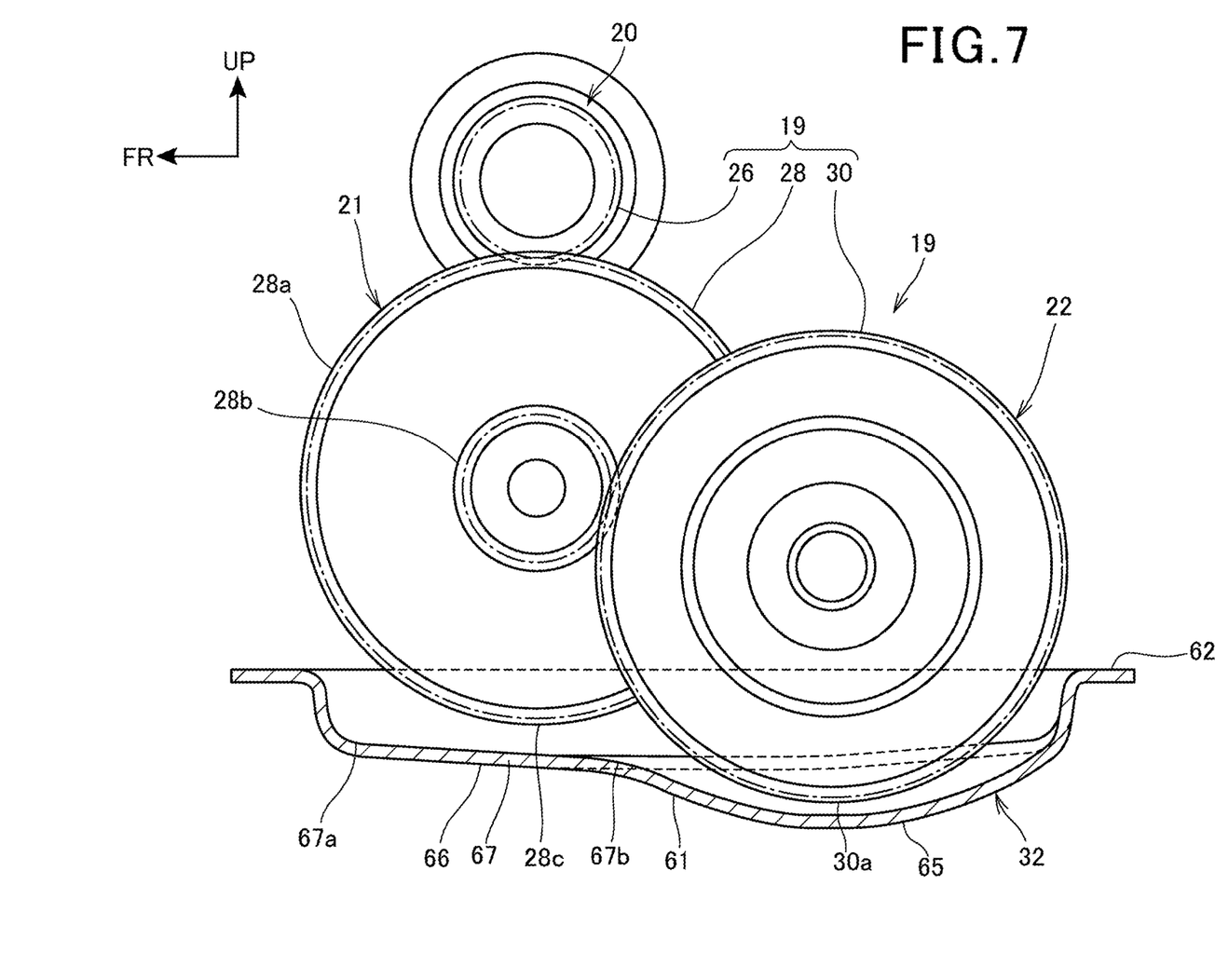
FIG. 7 is a sectional view of an oil pan taken along a plane vertical to an axial direction of a counter gear.

FIG. 7 is a sectional view of the oil pan 32 taken along a plane vertical to the axial direction of the counter gear 28. In FIG. 7, the gear train 19 is illustrated together with the oil pan 32.

With reference to FIGS. 3 to 5, and 7, the oil pan 32 includes a pot-like storage 61 with its upper surface open, and a flange portion 62 extending from the upper edge of the storage 61 to the lateral outside. The oil pan 32 is fixed to the lower surface of the case body 31 with a plurality of oil pan fixing bolts 63 inserted into the flange portion 62 from below.

The storage 61 includes a lower end storage 65 and a lubricant introduction portion 66 formed above the lower end storage 65, the lower end storage 65 covering from below the output gear 30 that is the lowermost-level gear located at the lowest position in the gear train 19.

The lubricant introduction portion 66 is positioned immediately below the counter gear 28 and covers the counter gear 28 from below.

The lower end storage 65 constitutes the lower end of the oil pan 32 that is depressed downward along the lower end 30a of the output gear 30.

The bottom of the lubricant introduction portion 66 is formed by a lubricant guide surface 67 that is inclined so as to descend toward the lower end storage 65.

Specifically, as illustrated in FIG. 7, in the axial view of the output gear 30, the lubricant guide surface 67 is inclined so as to descend toward the output gear 30 from an upper end 67a, which is positioned on the opposite side from the lower end storage 65, to a lower end 67b. Further, as illustrated in FIG. 5, the lubricant guide surface 67 is inclined so as to descend from opposite ends 67c, 67c of the output gear 30 in the axial direction on the lubricant guide surface 67 toward a central part 67d of the output gear 30 in the axial direction on the lubricant guide surface 67. A valley shape going downward from opposite ends 67c, 67c toward the central part 67d is formed in the range from the upper end 67a to the lower end 67b. That is, the lubricant guide surface 67 is formed in a tub shape declining toward the output gear 30 and depressed such that the central part 67d in the width direction is the lowest.

With reference to FIGS. 4 and 5, when a part of lubricant L, supplied from the oil pan 32 to each of the input gear 26 and the counter gear 28, drops and returns to the oil pan 32 as illustrated in FIGS. 4 and 5, the part of the lubricant L moves downward along the inner surface of the inclined portion 34b positioned below the input gear 26. In the present embodiment, since the internal space of the case 23 is wider on the lower side due to the inclined portion 34b, it is possible to efficiently guide the lubricant in the upper part of the case 23 to the oil pan 32 on the lower side.

Further, since the guide ribs 60, 60 extending in the up-down direction are formed in the inclined portion 34b, the rigidity of the other-side side wall 34 can be improved by the guide ribs 60, 60, and the lubricant can be efficiently guided by the guide ribs 60, 60 to the oil pan 32 on the lower side The lubricant having moved from the inclined portion 34b to the lubricant guide surface 67 immediately below the inclined portion 34b moves downward to the output gear 30 side along the lubricant guide surface 67 that declines toward the lower end storage 65, and reaches the lower end storage 65. In the present embodiment, the lubricant guide surface 67 is inclined so as to descend from opposite ends 67c, 67c of the output gear 30 in the axial direction on the lubricant guide surface 67 toward the central part 67d, whereby the lubricant can be collected to the central part 67d and the flow of the lubricant moving downward toward the lower end storage 65 can be formed easily. It is thereby possible to efficiently return the lubricant to the lower end storage 65 and efficiently circulate the lubricant from the lower end storage 65 to the gear train 19.

As described above, according to the embodiment to which the present invention has been applied, the transmission 15 includes: the transmission shaft 21 driven by the electric motor 14; and the case 23 that supports the electric motor 14 and the transmission shaft 21, the transmission including the adapter 24 which is interposed between the case 23 and the electric motor 14 and to which the electric motor 14 is attached, and the adapter 24 is in contact with one end 27a of the transmission shaft 21 in the axial direction of the transmission shaft 21. As a result, the transmission shaft 21 can be retained using the adapter 24 to which the electric motor 14 is attached, so that it is possible to omit a dedicated retaining member and simplify the structure of the transmission 15.

Further, since the adapter 24 is made of a material having electric insulation, it is possible to attach the electric motor 14 to the transmission 15 in an electrically insulated state, and retain the transmission shaft 21 by using the adapter 24.

Moreover, the case 23 includes the opening 39a that exposes the one end 27a of the transmission shaft 21 to the outside of the case 23, and the one end 27a of the transmission shaft 21 and the adapter 24 are in contact with each other in the axial direction of the transmission shaft 21 through the opening 39a. It is thus possible to bring the adapter 24 into contact with the one end 27a of the transmission shaft 21 exposed from the opening 39a and retain the transmission shaft 21 with a simple structure.

The transmission shaft 21 includes the shaft 27 supported by the case 23, and the counter gear 28 rotationally provided on the shaft 27 to mesh with the motor output shaft 14b of the electric motor 14, and the shaft 27 is retained by the adapter 24. As a result, the shaft 27 supporting the counter gear 28 hardly rotates, so that the shaft 27 can be easily retained by the adapter 24.

Further, the case 23 includes the one-side support hole portion 39 that supports the one end 27a of the shaft 27 and communicates with the inside and the outside of the case 23, the one end 27a and the adapter 24 are in contact with each other in the axial direction of the shaft 27 through the support hole portion 39, and the seal member 41 is provided between the outer periphery of the one end 27a and the support hole portion 39. Hence the one end 27a of the shaft 27 and the adapter 24 can be brought into contact with each other through the one-side support hole portion 39 of the case 23 to retain the shaft 27 with a simple structure, and the case 23 can be favorably sealed by the seal member 41 provided between the outer periphery of the one end 27a and the support hole portion 39.

Moreover, since the cover member 25 covering the electric motor 14 is attached to the adapter 24, it is possible to attach the cover member 25 with a simple structure.

According to the embodiment to which the present invention has been applied, the transmission 15 includes: the gear train 19 driven by the electric motor 14; the case 23 that supports the gear train 19 inside; the lubricant that fills the case 23; and the oil pan 32 provided at the bottom of the case 23, the oil pan 32 includes the lubricant guide surface 67 that is positioned above the lower end 30a of the output gear 30 located at the lowest position in the gear train 19, and the lubricant guide surface 67 is inclined so as to descend toward the output gear 30 in the axial view of the output gear 30, and is inclined so as to descend from opposite ends 67c, 67c of the output gear 30 in the axial direction on the lubricant guide surface 67 toward the central part 67d. Accordingly, by the lubricant guide surface 67 that is inclined so as to descend toward the output gear 30 in the axial view of the output gear 30 and is inclined so as to descend from opposite ends 67c, 67c toward the central part 67d, the lubricant guided to the oil pan 32 can be guided to the bottom of the oil pan 32 in the vicinity of the output gear 30. Hence the lubricant circulating in the case 23 can be once collected to the vicinity of the output gear 30 and efficiently circulated throughout the gear train 19 from the output gear 30 side, and the lubricant can be appropriately supplied to the entire gear train 19.

The case 23 includes the other-side side wall 34 facing the tip of the motor output shaft 14b of the electric motor 14, and the other-side side wall 34 includes the inclined portion 34b that is inclined so as to be more separated from the motor output shaft 14b in the axial direction toward the lower oil pan 32 side. Accordingly, it is possible to efficiently guide the lubricant in the case 23 to the oil pan 32 on the lower side along the inclined portion 34b of the other-side side wall 34.

The gear train 19 includes the counter gear 28 that meshes with the motor output shaft 14b and the output gear 30 that meshes with the counter gear 28, the counter gear 28 integrally includes the driven gear portion 28a that meshes with the motor output shaft 14b and the driving gear portion 28b that meshes with the output gear 30, and in the driven gear portion 28a, at least the lower end 28c is positioned inside the oil pan 32. Hence the lubricant can be supplied to the motor output shaft 14b by the driven gear portion 28a that has its lower end 28c positioned inside the oil pan 32 and meshes with the motor output shaft 14b. Further, the lubricant can be supplied to the driving gear portion 28b by the output gear 30 that meshes with the driving gear portion 28b provided inside the oil pan 32.

The guide ribs 60, 60 protruding to the inside of the case 23 are formed in the inclined portion 34b, and the guide ribs 60, 60 are extended in the up-down direction, whereby it is possible to efficiently guide the lubricant to the oil pan 32 on the lower side along the guide ribs 60, 60.

The driving gear portion 28b has a diameter smaller than that of the driven gear portion 28a and is provided closer to the other-side side wall 34 side than the driven gear portion 28a. Hence the guide ribs 60, 60 can be compactly provided effectively using the space on the driving gear portion 28b having a diameter smaller than that of the driven gear portion 28a.

The guide ribs 60, 60 are provided above the driving gear portion 28b, and overlap with the driven gear portion 28a in the axial view of the counter gear 28. Hence the guide ribs 60, 60 can be compactly provided effectively using the space above the driving gear portion 28b having a diameter smaller than that of the driven gear portion 28a. Further, the lubricant from the driven gear portion 28a can be efficiently guided by the guide ribs 60, 60.

The oil pan 32 includes the lower end storage 65 constituting the lower end of the oil pan 32 that is depressed downward along the lower end 30a of the output gear 30. Accordingly, the lubricant can be collected to the lower end storage 65 and effectively circulated, and the oil pan 32 can be compactly formed in the peripheral portion of the lower end storage 65.

The lubricant guide surface 67 is inclined so as to descend toward the lower end storage 65. With the lower end storage 65 being the lower end of the oil pan 32, the lubricant can be easily collected and the lubricant can be efficiently supplied from the lower end storage 65 to the gear train 19.

Further, with the lubricant guide surface 67 being provided below the inclined portion 34b, the lubricant guided downward from the inclined portion 34b can be efficiently guided to the lowermost-level gear side by the lubricant guide surface 67.

Note that the above embodiment illustrates one aspect to which the present invention has been applied, but the present invention is not limited to the above embodiment.

In the above embodiment, the description has been given assuming that the contact portion 50c that is the recessed portion of the adapter 24 comes into contact with the one end 27a of the shaft 27 protruding outside through the opening 39a, but the present invention is not limited thereto, and the contact portion 50c may only have a shape capable of retaining the shaft 27. For example, the one end 27a of the shaft 27 may be formed to be flush with the outer end of the opening 39a and the flat contact portion of the adapter 24 may be brought into contact with the one end 27a. Alternatively, in order for the one end 27a to be positioned more inside than the outer end of the opening 39a, the shaft 27 may be formed shorter than the state of FIG. 5, a protruding contact portion that protrudes to the inside of the opening 39a may be formed in the adapter 24, and the contact portion may be brought into contact with the one end 27a. The contact portion 50c may not necessarily be in constant contact with the one end 27a, but may be configured to come into contact with the one end 27a at the time of movement of the shaft 27.

Further, the contact portion 50c may come into contact with the shaft 27 via the spacer that is interposed between the contact portion 50c and the one end 27a.

In the above embodiment, the description has been given assuming that the contact portion 50c that is the recessed portion of the adapter 24 comes into contact with the one end 27a of the shaft 27, but a gap may be formed between the one end 27a and the contact portion 50c as long as the shaft 27 can be retained by the adapter 24. In this instance, by shifting the shaft 27 to the contact portion 50c side in the axial direction, the one end 27a comes into contact with the contact portion 50c, and the shaft 27 is retained.

In the above embodiment, the description has been given assuming that the guide ribs 60, 60 overlap with the driven gear portion 28a in the axial view of the counter gear 28, but this is not restrictive, and the guide ribs 60, 60 can be configured so as to overlap with at least either the driven gear portion 28a or the input gear 26 of the motor output shaft 14b in the axial view of the counter gear 28. For example, in FIG. 4, when the guide ribs 60, 60 are disposed closer to the imaginary line S, the guide ribs 60, 60 can overlap with both the driven gear portion 28a and the input gear 26 in the axial view of the counter gear 28.

REFERENCE SIGNS LIST

14 Electric motor
14b Motor output shaft
15 Transmission
21 Transmission shaft
23 Case
24 Adapter
25 Cover member
27 Shaft
27a One end (One end of transmission shaft, One end of shaft)
28 Counter gear (Gear)
39 One-side support hole portion (Support hole portion)
39a Opening
41 Seal member

The invention claimed is:

1. A trans on comprising:
a transmission shaft driven by an electric motor; and
a case that supports the electric motor and the transmission shaft,
the transmission including an adapter which is interposed between the case and the electric motor and to which the electric motor is attached,
wherein
the adapter is in contact with one end of the transmission shaft in an axial direction of the transmission shaft,
the case includes a support hole portion that supports the one end of the transmission shaft and Communicates with an inside and an outside of the case, and
the one end and the adapter are in contact with each other in the axial direction of the transmission shaft through the support hole portion.

2. The transmission according to claim 1, wherein the adapter is made of a material having electric insulation.

3. The transmission according to claim 1, wherein
the transmission shaft includes a shaft supported by the case, and a gear rotationally provided on the shaft to mesh with a motor output shaft of the electric motor, and
the shaft is retained by the adapter.

4. The transmission according to claim 1, wherein
a seal member is provided between an outer periphery of the one end of the transmission shaft and the support hole portion.

5. The transmission according to claim 1, wherein a cover member that covers the electric motor attached to the adapter.

* * * * *